(12) United States Patent
Steinway et al.

(10) Patent No.: US 7,518,542 B1
(45) Date of Patent: *Apr. 14, 2009

(54) HANDHELD RADAR FREQUENCY SCANNER FOR CONCEALED OBJECT DETECTION

(75) Inventors: William Steinway, New Smyrna Beach, FL (US); Gregory Stilwell, Orlando, FL (US); Herbert Duvoisin, III, Orlando, FL (US); David H. Fine, Cocoa Beach, FL (US); Ravi K. Konduri, Heathrow, FL (US)

(73) Assignee: CyTerra Corporation, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/235,533

(22) Filed: Sep. 27, 2005

Related U.S. Application Data (63) Continuation of application No. 10/308,172, filed on Dec. 3, 2002, now Pat. No. 6,950,054.

(60) Provisional application No. 60/334,533, filed on Dec. 3, 2001.

(51) Int. Cl.
*G01S 13/04* (2006.01)

(52) U.S. Cl. .......................... 342/22; 342/27

(58) Field of Classification Search ............. 342/21–22, 342/27–28, 90, 173, 199
See application file for complete search history.

(56) References Cited

U.S. PATENT DOCUMENTS

| | | | |
|---|---|---|---|
| 3,707,672 A | 12/1972 | Miller et al. |
| 3,713,156 A | 1/1973 | Pothier |
| 4,122,783 A | 10/1978 | Pretini |
| 4,471,343 A | 9/1984 | Lemelson |
| 5,081,456 A | 1/1992 | Michiguchi et al. |
| 5,181,234 A | 1/1993 | Smith |
| 5,227,800 A | 7/1993 | Huguenin et al. |
| 5,339,080 A | 8/1994 | Steinway et al. |
| 5,345,240 A | 9/1994 | Frazier |
| 5,552,705 A | 9/1996 | Keller |
| 5,557,283 A | 9/1996 | Sheen et al. |
| 6,342,696 B1 | 1/2002 | Chadwick |
| 6,359,582 B1 | 3/2002 | MacAleese et al. |
| 6,417,797 B1 | 7/2002 | Cousins et al. |
| 6,469,624 B1 | 10/2002 | Whan et al. |
| 6,501,414 B2 | 12/2002 | Arndt et al. |
| 6,650,276 B2 | 11/2003 | Lawless |
| 2002/0008655 A1 | 1/2002 | Haj-Yousef |
| 2003/0179126 A1 | 9/2003 | Jablonski et al. |

*Primary Examiner*—Isam Alsomiri
(74) *Attorney, Agent, or Firm*—Fish & Richardson P.C.

(57) ABSTRACT

A handheld radar frequency scanner system for detecting objects concealed on a person, the system includes a radar transmitter coupled to a transmit antenna that is configured and positioned to direct a radar signal at a person, a radar receiver coupled to a receive antenna that is configured to detect a portion of the radar signal reflected by the person, and a processor connected to the radar receiver and operable to process the portions of the radar signals detected by the radar receiver to determine whether the person is carrying a concealed object. The system may produce a real-time alert, such as an audible alert, when a concealed object is detected.

19 Claims, 7 Drawing Sheets

HANDHELD RADAR FREQUENCY SCANNER FOR CONCEALED OBJECT DETECTION

CROSS-REFERENCE TO RELATED APPLICATIONS

This application claims priority from provisional application No. 60/334,533, filed Dec. 3, 2001, which is incorporated by reference.

TECHNICAL FIELD

This description relates to a handheld scanner for detecting concealed objects, such as objects concealed on a person who is entering a secured area.

BACKGROUND

One common approach to detecting concealed objects on a person is to scan the person using a handheld metal detector at a security checkpoint.

SUMMARY

Techniques are described for implementations of a handheld scanner that employs radar frequency detection algorithms to yield a very high probability of detection against concealed objects that can be dangerous or undesirable. The high detection probability is coupled with a low false alarm rate. In particular, a handheld radar frequency scanner may employ target detection technology that uses radar signals in an aviation security context in order to counteract potential terrorist acts involving smuggling of explosives and/or other objects on the body. The handheld radar frequency scanner detects differences in reflected radar frequency energy due to an object placed between the clothing and the skin of a person.

In one implementation, a handheld radar frequency scanner for detection of objects concealed on a person includes a radar transmitter and transmit antenna that are configured and positioned to direct a radar signal at a person, and a radar receiver and receive antenna that are configured and positioned to detect a portion of the radar signal reflected by the person. A processor connected to the radar receiver processes the portion of the radar signal detected by the radar receiver to determine whether the person is carrying a concealed object. The handheld scanner may include a display and may produce a real-time alert, such as an audible alert, when a concealed object is detected. In one implementation, the radar signal uses a frequency between approximately 1.5 gigahertz and 12 gigahertz. The radar signal may be a frequency stepped signal, and may have an output power of less than one milliwatt. In one implementation, the handheld radar frequency scanner system is a monostatic radar system. In another implementation, the handheld radar frequency scanner system is: a bistatic radar system. Implementations of the transmit antenna and the receive antenna may include a spiral antenna or an endfire waveguide antenna.

Other features will be apparent from the following description, including the drawings, and the claims.

DESCRIPTION OF DRAWINGS

Like reference symbols in the various drawings indicate like elements.

DESCRIPTION

A handheld scanner transmits a radar frequency (RF) signal from an antenna. The signal is reflected and the reflected signal energy is detected and processed. The processing methodology used by the handheld scanner determines when the reflected signal appears to be coming from objects that need to be detected. The handheld scanner applies detection algorithms in the context of aviation security and other situations to detect explosives and other objects on the body of a person, such as a person passing through a security checkpoint.

In one implementation, the handheld scanner may use detection algorithms developed for buried mine detection. In the case of non-metallic mines buried in the ground, algorithms developed for mine detection have been very successful in the detection of explosives contained within a plastic housing. In the case of concealed objects on a person, such as, for example explosives that have a form factor of one cm thickness over an extended area of several cm length and width, similar detection methodology may be used. However, other detection algorithms well known in the art may also be used.

The detection algorithms detect the reflected body signal. When algorithms developed for mine detection are used, the reflected body signal corresponds to detecting the signal reflected from the ground in mine detection. When an object is present on the body, the reflected signal amplitude, phase, and frequency content and timing characteristics will change. It is this change in the reflected signal that is recognized by the algorithms and declared as a detection of an object. The advanced detection algorithms used by the handheld scanner perform with a high probability of detection (Pd) and a low false alarm rate (FAR).

While the handheld scanner is comparable in some ways to a detector used for buried mine detection, there are several differences including, for example, a different frequency band and a different system/antenna size. Also, different detection algorithms may be used. In general, the frequency band used by the handheld scanner is wider and of slightly higher frequency than typically is useful for buried mine detection because, among other things, clothing transmits higher frequencies than are transmitted by several inches of soil. Due to differences between the handheld scanner and the mine detection equipment, different detection algorithms may be used, or different parameters may used for the detection algorithms in order to optimize system performance for the detection of objects on a person.

Figure 1A:
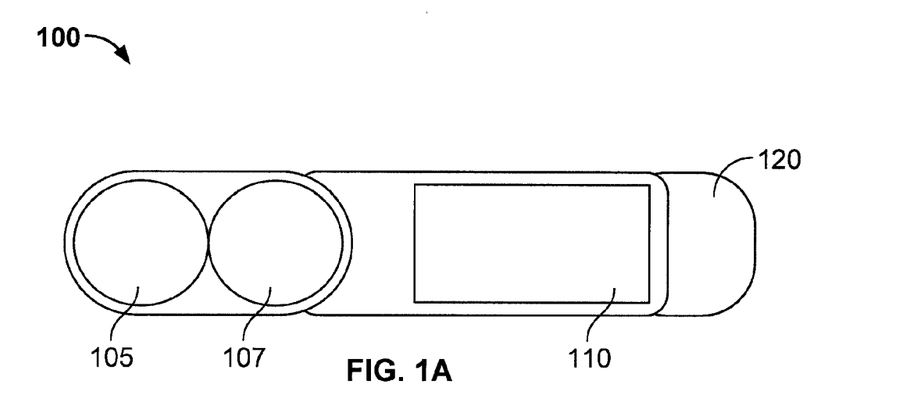
FIG. 1A is a top view of a handheld radar frequency scanner.
Figure 1B:
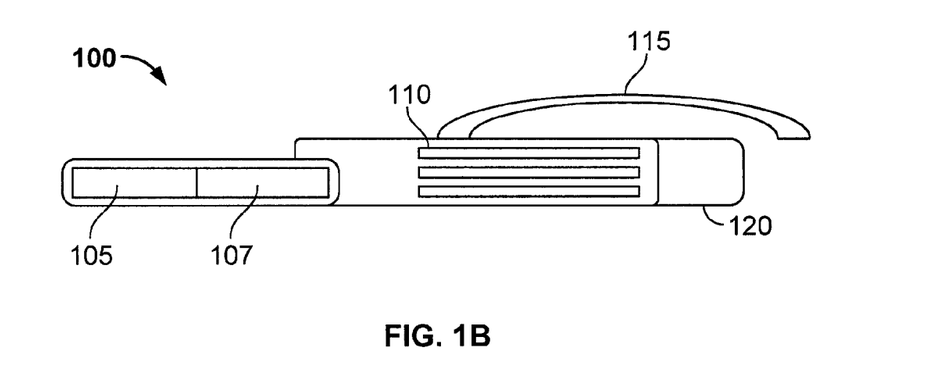
FIG. 1B is a side view of a handheld radar frequency scanner.

Referring to FIGS. 1A and 1B, a handheld radar frequency scanner 100 includes antennas 105 and 107 for transmitting and receiving a radar frequency (RF) signal. The scanner is a bistatic radar system, in that there are separate antennas for transmitting and receiving the RF signal. In one implementation, antenna 105 is connected to a radar transmitter and transmits an RF signal toward a target, and the antenna 107 is connected to a radar receiver and receives a portion of the RF signal that is reflected by the target. In another implementation, antenna 107 is connected to the radar transmitter and antenna 105 is connected to the radar receiver. In yet another implementation, the handheld scanner may be a monostatic radar system that uses a single antenna to transmit and receive the RF signal. The following discussion assumes that the antenna 105 is the transmitting antenna and the antenna 107 is the receiving antenna.

The receiving antenna 107 is coupled to an electronics module 110 that includes a signal processing system to process received RF signals from the receiving antenna 107. The electronics module 110 also includes a transmitter coupled to the transmitting antenna 105. A handle 115 assists the operator in manipulating the scanner 100, and a battery pack 120 supplies power to the electronics module 110.

The scanner 100 provides low-cost, real-time, and user-friendly object detection using ultra-low power radar ($<1/100$ specific absorption rate "SAR," the standard limit for human exposure). The scanner 100 generates a single-beam, low-resolution surface reflectivity measurement. As the person is scanned, a detection algorithm executed by the signal processor emits a tone or otherwise indicates an object detection if the contrast in reflectivity indicates that an object such as, for example, a concealed plastic explosive, a box-cutter, a plastic knife, or currency is present. Measurements are attempted over a signal bandwidth from approximately 1.5 GHz to approximately 12 GHz. Frequencies up to approximately 12 GHz, or beyond, may be useful when the object dimensions are thinner than 1 cm. Objects such as, for example, plastic items, having thicknesses of 2 mm or less, may be detected using the higher end of the 12 GHz band of frequencies.

Figure 1C:
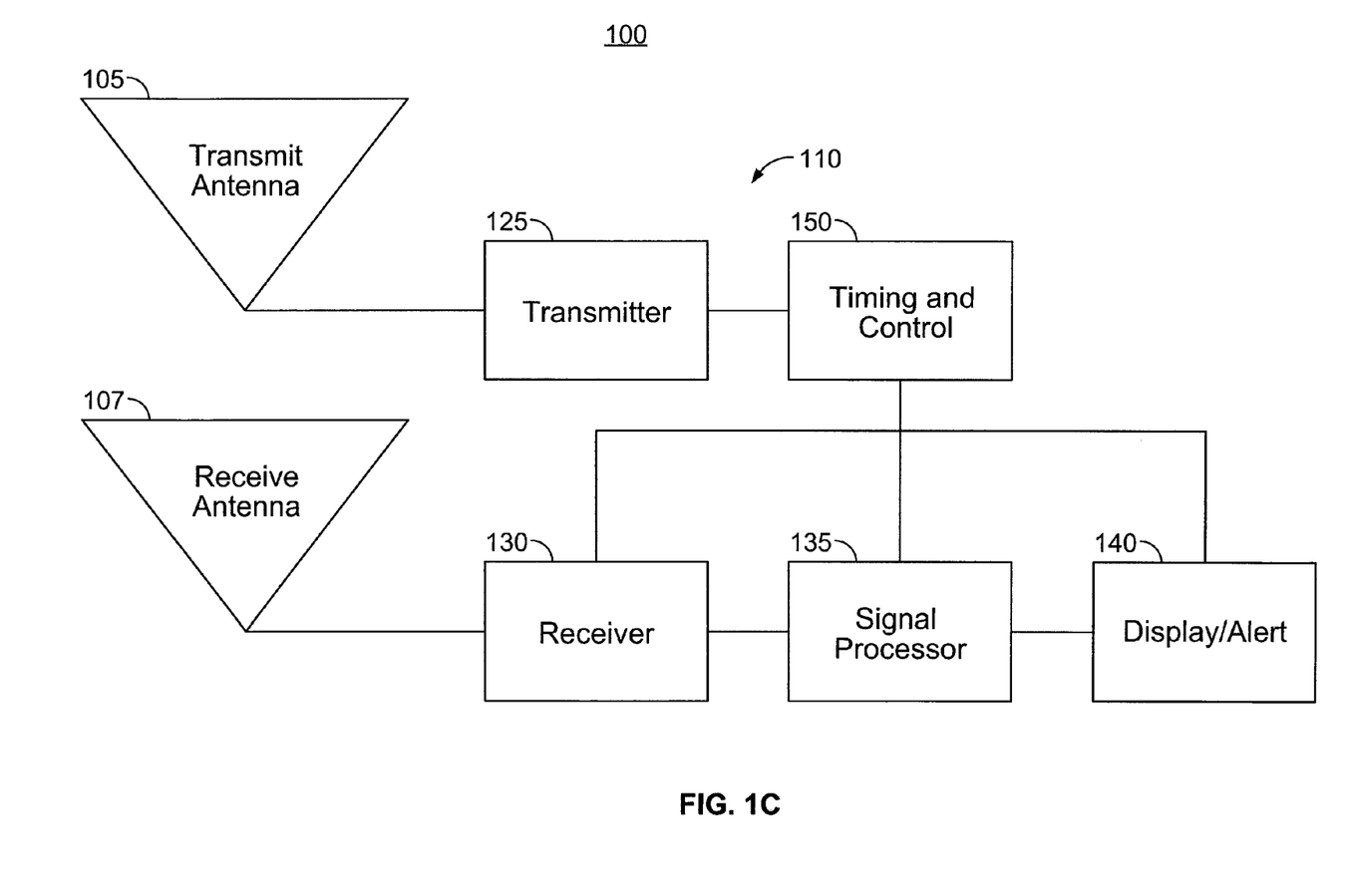
FIG. 1C is a block diagram of a handheld radar frequency scanner.

Referring to FIG. 1C, in one implementation, the transmit antenna 105 is connected to a radar transmitter 125 that transmits an RF signal toward a target. The scanner 100 also includes a receive antenna 107 connected to a radar receiver 130 that receives the reflected RF signal from the target. The receiver 130 is coupled to a signal processing system 135 that processes received RF signals from the receiving antenna 107. The signal processing system 135 is coupled to a display 140 and a timing and control module 150. The display 140 provides an audible and/or a visual alert when an object is detected by the scanner. The timing and control module 150 may be connected to the transmitter 125, the receiver 130, the signal processor 135, and the display 140. The timing and control module provides signals, such as a clock signal and control signals, to the other components of the scanner 100. The electronics module 110 of FIGS. 1A and 1B contains the transmitter 125, the receiver 130, the signal processing system 135, the display 140, and the timing and control module 150.

Figure 2A:
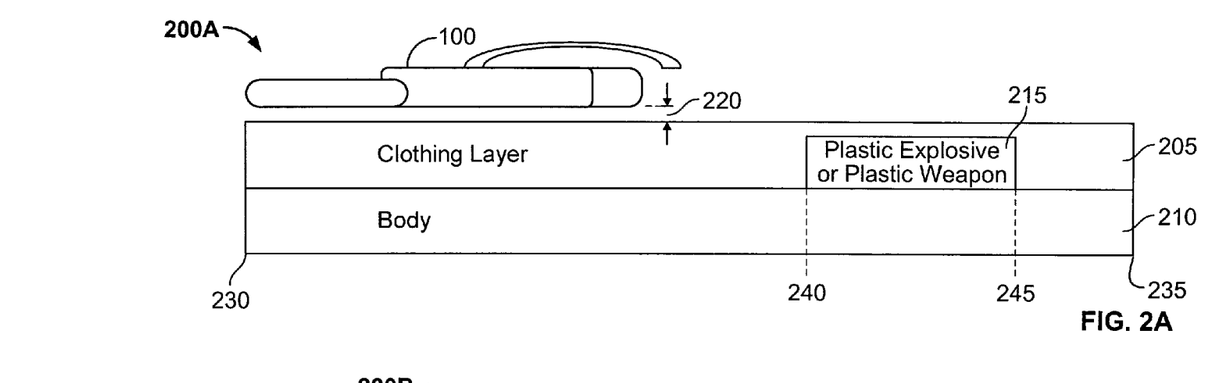
FIG. 2A is a diagram showing concealed object detection using the handheld radar frequency scanner of FIGS. 1A, 1B, and 1C.

FIG. 2A illustrates a system 200A for concealed object detection using the handheld scanner 100 of FIGS. 1A, 1B, and 1C. The handheld scanner 100 is held at a distance 220 over a clothing layer 205 of a person to be scanned. The distance 220 may be a fixed or a variable distance, and may vary within a scan as well as from scan to scan. The clothing layer 205 is on top of the body 210 of the person to be scanned. There is an explosive device or other object 215 concealed between the clothing layer 205 and the body. For simplicity, the clothing layer 205 is shown as being in direct contact with the body 210, and the object 215 is shown as being in direct contact with the clothing layer 205 and the body 210. In actual practice, there may be a gap between the body 210 and the clothing layer 205, and gaps between the clothing layer 205, the object 215 and the body 210. However, such gaps do not result in a significant change in performance because the dielectric constant of clothing is close to that of air.

The scanner 100 is moved over the clothing layer 205 from a start position 230 to a finish position 235. The path of the scanner includes an object start position 240 and an object end position 245.

Figure 2B:
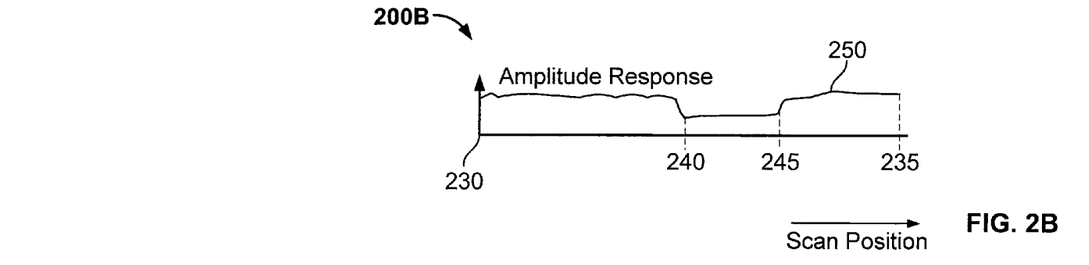
FIGS. 2B and 2C are graphs illustrating signals produced by the system of FIG. 2A.
Figure 2C:
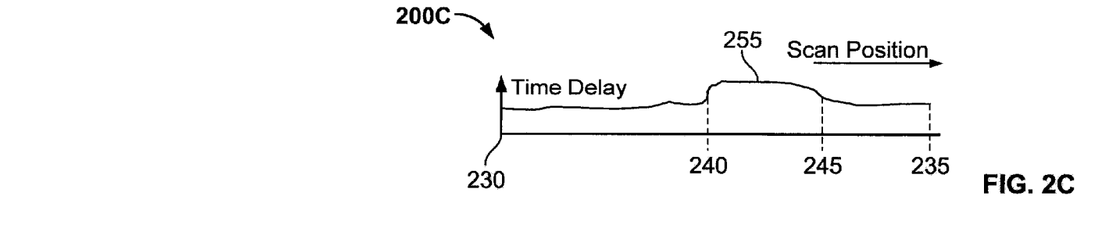

FIGS. 2B and 2C illustrate signals produced by the system of FIG. 2A in response to the concealed object 215. In particular, FIG. 2B illustrates an amplitude response signal 250 produced in response to the object 215 positioned under the clothing layer 205 and FIG. 2C illustrates a time delay signal 255 produced in response to the object 215 positioned under the clothing layer 205. As shown, both of the signals 250 and 255 include significant level changes in response to the object 215 as the scanner 100 is scanned from the object start position 240 to the object end position 245.

The reflection from object 215 differs from that of the body 210 based on the material dielectric properties. The signal passes through the object 215, reflects off the body 210, and passes back through the object 215. As shown in FIGS. 2B and 2C, the portion of the signal that encounters the object 215 is attenuated and time delayed relative to the reflection from the body 210 alone.

A wideband signal may be used to obtain a time resolution of the body surface 210 and the time difference between the signal reflected by the surface of the body 210 and the signal reflected by the surface of the concealed object 215. This time resolution allows for thickness measurements of the concealed object 215 and discrimination of unwanted clutter that can occur in the signal return. A wideband signal may also be used to mitigate the fluctuations that can occur due to speckle signal cancellation if a single frequency or narrow band of frequencies is used. Speckle signal cancellation occurs when the complex reflections from the body 210, the concealed object 215, and other spurious reflections add up to zero and therefore cancel each other, resulting in no change in the signal level being observed and detection of no indication of the presence of the object 215. By using a wide band of frequencies, the chances that speckle signal cancellation can occur are reduced.

The time-resolved signal reflection from the body 210 of the person is attenuated mainly due to the phase disturbances caused by the presence of the concealed object 215. The integrated signal energy over the entire band of frequencies under consideration may not change in value, but the phase of that energy versus frequency is modified significantly so as to be nonlinear. When the time-resolved signal is computed, the nonlinear phasing causes a modified peak signal response from the body 210 and a time shift to occur. The signal energy is spread out when the peak signal is reduced, and occurs at other times in the signal return.

There are many ways to compute the time-resolved signal. For example a Fast Fourier Transform (FFT) or a chirp Z transform may be used. The time signal may be computed in software, or may be computed in specialized hardware, such as a Digital Signal Processing (DSP) chip or a specialized compression chip device.

The detection of objects on personnel is indicated by the signal amplitude response. One well known challenge involved with detection processes is to ignore clutter. Clutter consists of unwanted target detections, known as false alarms. Many signal processing techniques are available to reduce the occurrence of false alarms. In one implementation, processing techniques to reduce false alarms in the detection of landmines may be used.

One exemplary technique to reduce false alarms is known as principal component analysis (PCA). Amplitude and phase response data is available at chosen frequency steps from the radar. This data is used to compute the PCA response for the non-targets areas, the false target or clutter areas, and the desired targets. A statistical database is then developed for the non-targets and the targets. The database is then referenced in real-time by the algorithm, and a detection is declared if the PCA measurement characteristics match the characteristics of a target in the database. The actual reference PCA statistical database is also updated in real-time to account for changes in the environmental conditions as the scanning is being conducted. Thus, for example, people with differing characteristics such as more or less clothing or different body parameters will not cause false alarms.

RF energy interacts with the body 210 depending on frequency. For example, the body absorbs from 30 to 300 MHz, partially absorbs from 300 MHz to 6 GHz, partially or diffusely reflects from 6 GHz to 15 GHz, and highly/specularly reflects at >15 GHz. Use of frequencies in the highly-reflective region Ka-band (27 to 33 GHz) may produce specular reflection images, which may cause difficulty with the detection of the concealed object 215. Ku-band (12 to 18 GHz) may produce better results, but straddles the transition from diffuse to specular reflection at approximately 15 GHz.

The techniques may employ the absorption/reflection transition frequency region from approximately 1.5 GHz to approximately 12 GHz. In this region, specific frequencies that maintain high dielectric differences between explosives and the body surface coexist with diffuse reflection from the skin and shallow body depths. This maintains radar cross section or reflection of the target without spoofing the detection process through specular reflection above approximately 12 GHz and without driving the radar cross section to unacceptably low levels below approximately 1 GHz.

In the region from 1.5 to 12 GHz, the dielectric for explosives is near 3, while the body covers ranges of 5 for fat, 10 for bone, 40 for skin, and 50 for muscle. This compares with the mine detection problem, where an explosives dielectric near 3 may be embedded in dielectrics between 4 for sand and 20 for wet loam. For concealed object detection, the clothing dielectric is near 1.1 (with air at 1.0) and therefore provides no significant reflection or effect on the RF energy. The higher dielectric is behind the target object, and there is typically much greater difference between the explosive dielectric and the body (for example, explosive to sand is a difference of 1; explosive to skin is a difference of 37).

Allowable general population/uncontrolled exposure sets the toughest limit on human exposure to RF radiation. At the frequencies of interest, the allowable density is 1 mw/cm2 (FCC) for 30 minutes averaging time, or about ⅕ to ⅒ of controlled exposure limits (IEEE and OSHA) for 6 minutes averaging time. At the surface of the transmitter, a density of 0.1-mW/cm2 is typical. Exposure while scanning the body is for less than 1 minute or about 1/30 the allowed time period, which in combination with the ⅒ lower maximum energy-density, yields a very safe 1/300 exposure margin. By comparison, 600 mW is allowed for cell phones such that one could place his or her head against a transmitter at maximum power of 10 mW and still be exposed only to one sixtieth of the permitted radiation for cell phones.

The handheld scanner 100 is also below the specific absorption rate (SAR) limit of 0.4 W/kg. Scanning of the entire body (typically 1.75 m$^2$ surface area) yields 0.035 W/kg for a typical 50 kg individual. This is 11 times less than required limits.

In one implementation, the RF models that have been developed, updated, and correlated with mine radar background and target characteristics are extended to the aviation security scenarios through use of the described handheld scanner. The models include target cross-section, SNR, and algorithm receiver operating characteristics (ROC) curves.

To establish the models, radar data is collected against desired targets and segregated into algorithm training and testing groups. Typically, enough data is collected to separate the groups wholly (to demonstrate the required Pd and FAR at 90% confidence, for example). Alternatively, so-called 'leave-one-out' testing may be performed to achieve nearly the same statistical significance with half the data. Training and testing on the same data (Train A/Test A) only provides a lower bound on the Bayes error for the population distribution. Train A/Test B (or equivalently, leave-one-out training/testing) provides the upper bound on the Bayes error that is practically a more useful predictor of system performance.

System performance may be defined in view of Pd versus FAR. Both Pd and FAR are evaluated together, preferably using ROC curve methodologies including confidence intervals. There are two measures of FAR, per individual and per group. For the former case, using 1.75 m$^2$ for surface area, and assuming similar system performance to the mine detection performance, then scaling this performance along the ROC curve yields a 2% FAR per individual at the required 90% Pd. Typically, only 1 in 50 individuals would have to be searched after using the handheld scanner.

For the aviation security problem, however, significantly better performance (near 100% Pd and near 0 FAR) is expected because of the relatively controlled/benign environmental factors involved, versus the unconstrained, outdoor, small mine detection problem. Specifically, the mine detection technology was designed and successfully tested against three types of backgrounds: gravel, grass, and bare soil. These terrains included, for example, buried roots and rocks. The targets included a 6 cm circular plastic encased explosive that is significantly smaller than a baseline 10 cm by 7.6 cm 'wallet' target.

Use of radar technology permits the system to provide real-time alerts. Typically, a real-time alert is in the form of an audio signal, so that little operator training and no operator interpretation is required. Typically, no actual imagery of either the object itself or the subject body will be created or displayed.

Real-time audio detection may be made available using multi-threaded processing that permits the simultaneous operation of advanced Automatic Target Recognition (ATR) algorithms, the Ground Penetrating Radar (GPR) control code, system tasks, and other tasks. The processing of GPR data may rely on Principal Component Analysis (PCA) performed automatically upon appropriately selected and conditioned features of the GPR response in clutter and target environments.

A frequency-stepped radar permits operation at an RF duty factor approaching unity. This removes the short-pulse radar requirement that the RF equipment (transmitter, antenna, and receiver) be instantaneously broadband. It also achieves a fully coherent radar capability while retaining (and expanding) the achievable high-range resolution capability. A high RF duty factor allows the thermal-noise-limited detection sensitivity of the radar to be achieved using readily available components. With the high RF duty-factor-stepped frequency waveform, the sensitivity limit is typically dictated by parameters related to the environment in which objects are located. The frequency-stepped radar is fully coherent, which allows for compensation of hardware amplitude and phase (dispersion) errors over the operating RF band.

A bi-static system (separate transmit and receive antennas) is used with appropriate calibration and signal processing. The described system allows for bandwidth control, a resultant sensitivity increase and an antenna match that can be achieved given the frequency bandwidth that must be covered and the various conditions through which the antenna must propagate energy. The overall radar specifications for one implementation are provided below in Table 1.

TABLE 1

Penetrating Radar Parameters

| | |
|---|---|
| Radar type | Frequency stepped |
| Receiver sensitivity | −110 dBm |
| Antennas | spirals or end fire waveguide |
| Frequency band | 1.5 to 12 GHz |
| Power output transmit | <1 milliwatt |
| Power | 24 V dc, 4 amps |
| Electronics/system weight | 2 kg |

Many types of antennas can be used for the handheld scanner, including spiral antennas and endfire waveguides. The requirements for the antenna are that they be able to transmit and receive the selected signal bandwidth without significant degradation of the amplitude and/or phase of the signal. In practice, the size of the antennas determines the size of the scanner search face. Thus, smaller antennas are more practical for the handheld scanner.

Figure 3A:
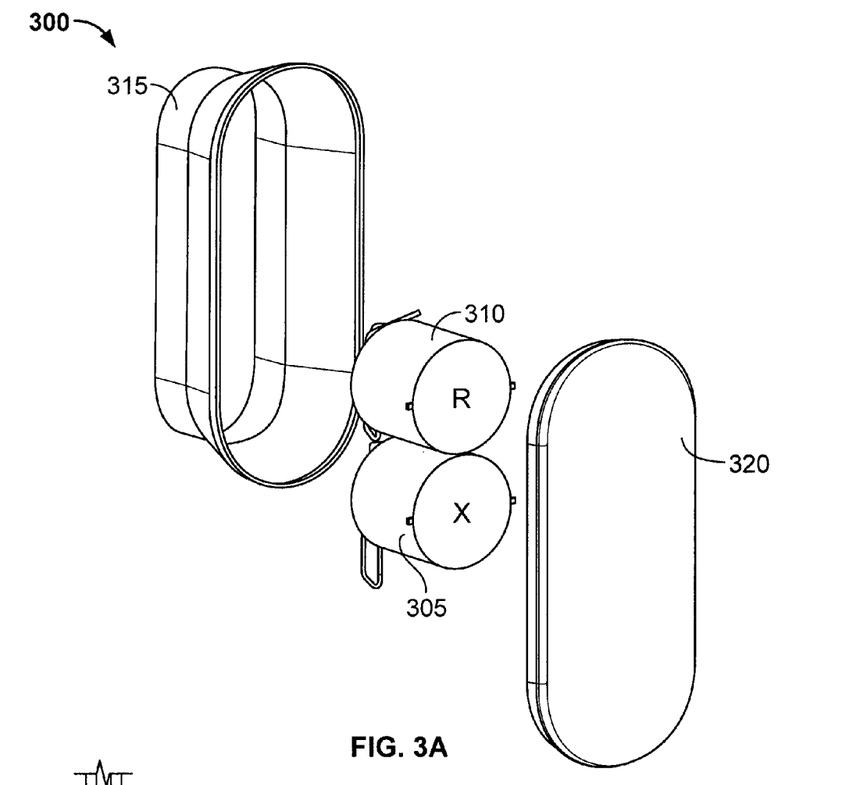
FIGS. 3A and 3B are perspective views of an antenna design for the system of FIGS. 1A, 1B, and 1C.

FIG. 3A illustrates an antenna design 300 employed in one implementation of the handheld scanner of FIGS. 1A, 1B, and 1C. The design 300 employs separate transmit 305 and receive 310 antennas to simplify the electronics, provide spatial separation and reduce very shallow reflections. The antennas 305 and 310 may be placed in a housing 315, and a cover 320 may be placed over the antennas. The cover 320 is made of a suitable radome material.

Figure 3B:
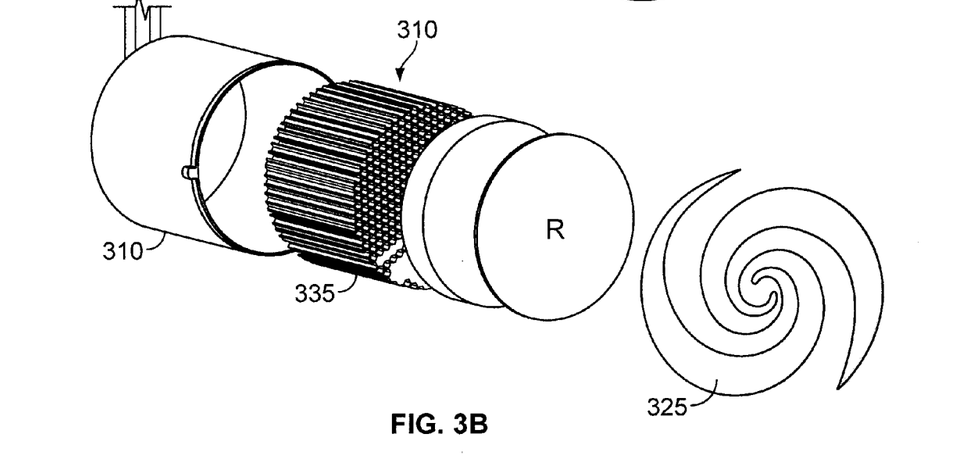

FIG. 3B further illustrates aspects of the antenna design 300 discussed above with respect to FIG. 3A. Although the following discussion refers to receive antenna 310, it is equally applicable to transmit antenna 305. As shown, the design 300 employs a spiral antenna 310 that is attractive from the viewpoint of size reduction. For an antenna to be an efficient radiator, it must normally have a dimension of at least one-half wavelength. The spiral radiates efficiently when it has an outer circumference of at least one wavelength. This means that the antenna needs a maximum diameter of about one-third wavelength. The upper frequency limit for efficient spiral radiation is set by the size of the feed point attachments, and the lower frequency limit is set by the outer diameter of the spiral structure. Within these limits, the spiral radiates efficiently in a frequency-independent manner. The input impedance and the radiation patterns will vary little over this frequency range. With a spiral structure, an upper frequency of 12 gigahertz presents no problem. The spiral antenna produces a circularly-polarized signal.

The spiral antenna 310 is constructed by etching the pattern on a printed circuit board. A planar, printed circuit, spiral antenna radiates perpendicularly to the plane of the spiral. The spiral 325 itself is located at the end of a cylindrical metal cavity 330 (the cavity back) to provide isolation from neighboring elements and electronics. Typically, an absorber 335 is used on the top side of the spiral inside the cavity 330 to make sure the element responds only downward.

Another type of antenna which may used is an endfire waveguide antenna. The configuration is slightly larger than the spiral configuration. The endfire waveguide antenna reduces the measurement spot size, thus making the exact position of the concealed object detected easier to locate. Other suitable types of wideband antennas may also be used.

Figure 4:
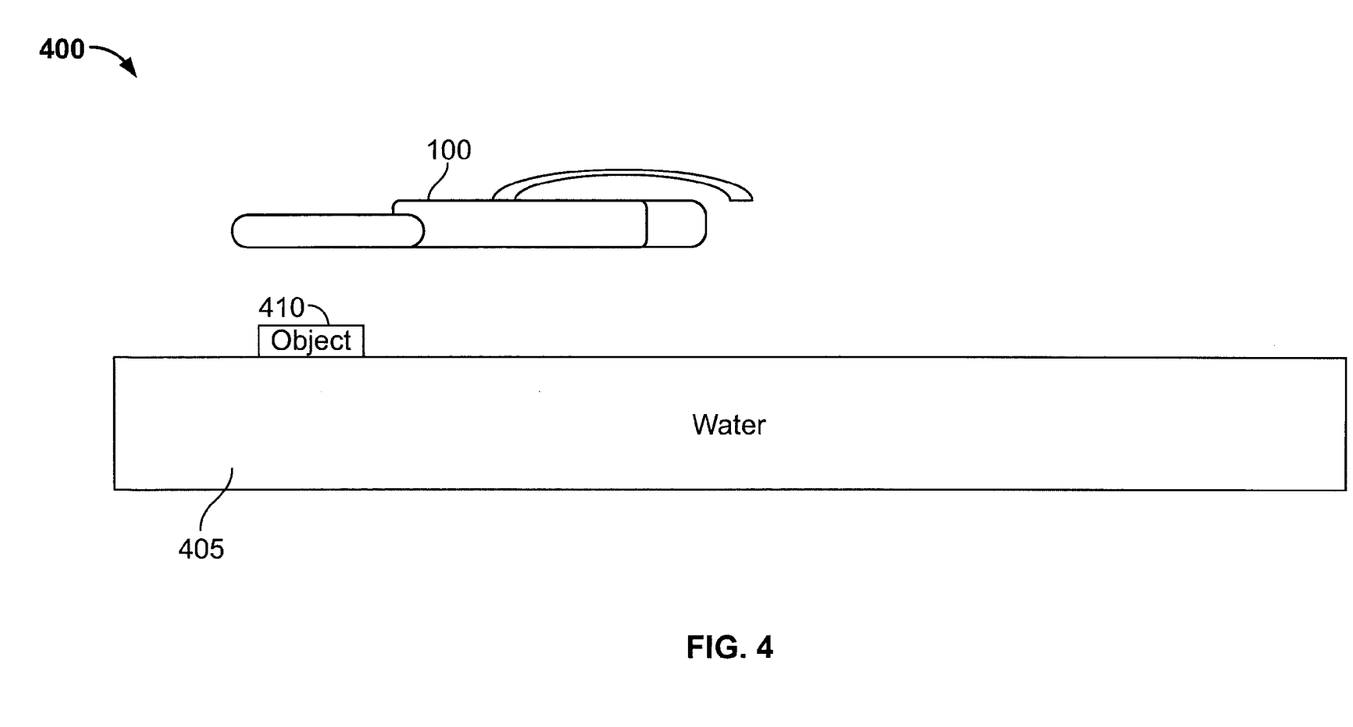
FIG. 4 is a diagram of a system for testing concealed object detection using the handheld radar frequency scanner of FIGS. 1A, 1B, and 1C.

FIG. 4 shows a system 400 for testing concealed object detection using the handheld radar frequency scanner of FIGS. 1A, 1B, and 1C. The handheld scanner 100 is passed over an object 410 placed in front of a simulated body. The body reflection is simulated by water 405 placed in a container which provides a reflection surface similar to that of a person's stomach.

Figure 5:
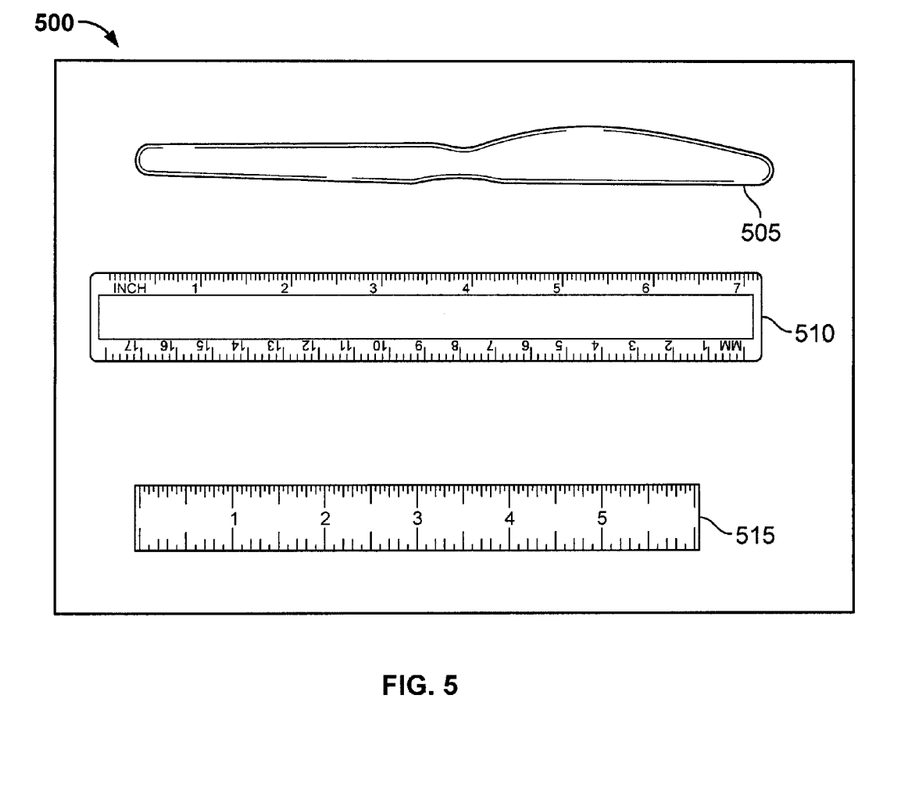
FIG. 5 is an illustration of objects used for detection in the system of FIG. 4.

FIG. 5 shows objects 500 which may be used as examples of the object 410 described with respect to the system of FIG. 4. The objects 500 include a plastic knife 505, a plastic ruler 510, and a metal ruler 515.

Figure 6:
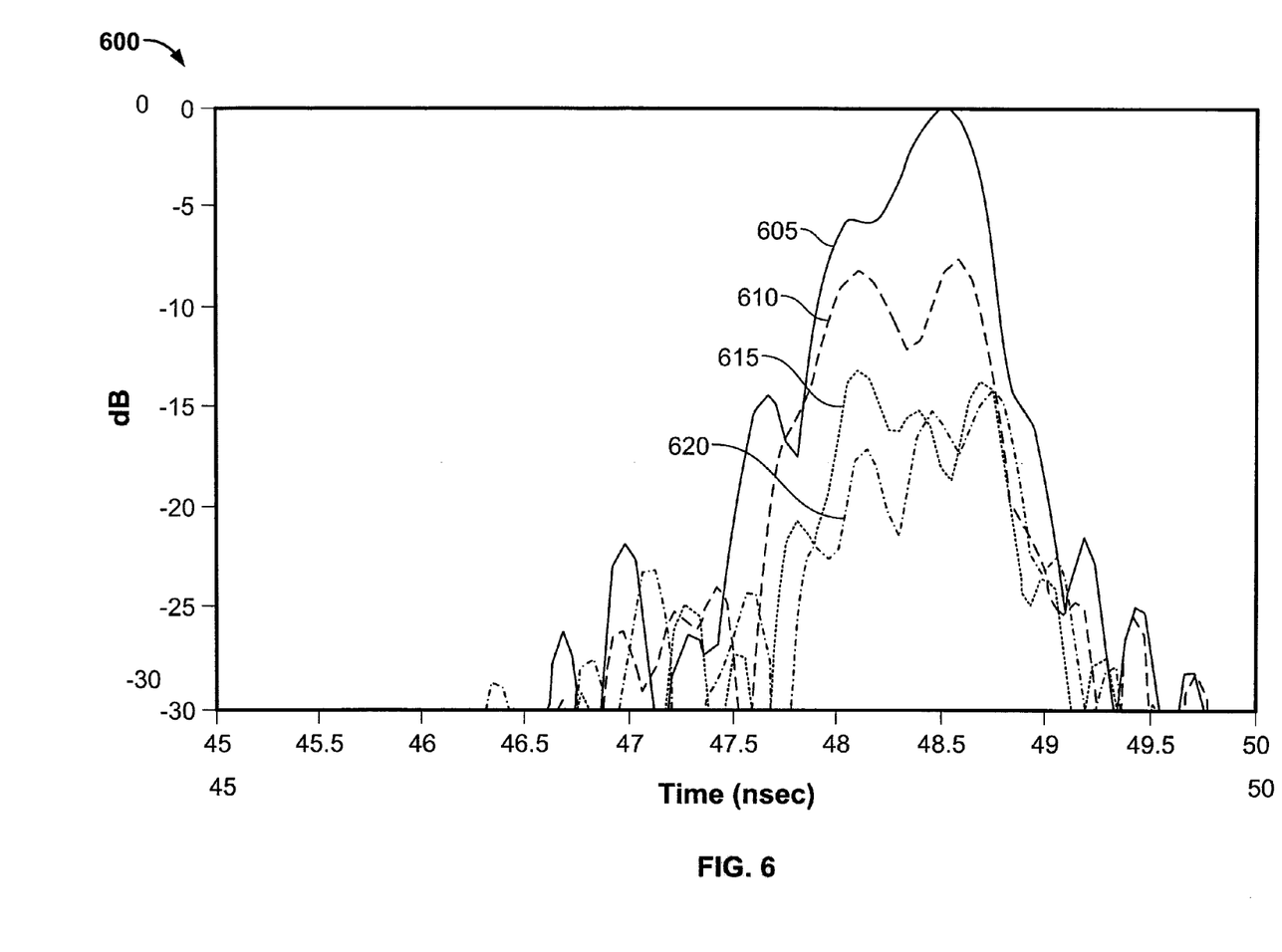
FIG. 6 is a graph illustrating performance of the system of FIG. 4 using the objects of FIG. 5.

FIG. 6 illustrates the amplitude response of the signal return when objects 500 described with respect to FIG. 5 are used as the object 410 in the system of FIG. 4. In particular, signal 605 is the water interface simulating the body reflection. Signals 610, 615, and 620 are, respectively, the signals corresponding to the use of the plastic knife 505, the plastic ruler 510, and the metal ruler 515 as the object 410 in the system 400 of FIG. 4. As shown, there is a significant signal reduction when any of the plastic knife 505, the plastic ruler 510, and the metal ruler 515 are encountered.

Suitable processing hardware for the handheld scanner includes any digital-based high speed processing equipment.

The described systems and techniques provide low cost, ease of use, and higher performance (better detection and lower false alarm rate) for a handheld scanner. A low-cost, user-friendly handheld scanner for difficult concealed object detection employs a comprehensive antenna and RF module design, along with sophisticated concealed/buried target detection algorithms. Data collected against different targets and in different conditions, together with adaptive/advanced algorithms, enable prediction and validation of performance for a range of potential operating frequencies.

The implementation of the handheld scanner typically is mechanically small so that the scanning operation can be easily accomplished. Also, the signal generation and reception electronics and the processing electronics typically are all contained within the handheld scanner. However, some components may be external to the scanner. The device power may be a battery or an AC power cord. The scanning operation consists of moving the antenna head part of the handheld device over the person being scanned, typically maintaining the distance of approximately 0-3 inches clearance. Touching the person with the device is not necessary. The sensitivity of the device may be reduced as the clearance increases beyond approximately three inches.

Other implementations are within the scope of the following claims.

We claim:

1. A handheld radar frequency scanner system for detecting objects concealed on a person, the system comprising:
   a radar transmitter coupled to a transmit antenna that is configured and positioned to direct a radar signal at a person;
   a radar receiver coupled to a receive antenna that is configured to detect a portion of the radar signal reflected by the person;
   a signal processor assembly including a processor, the signal processing assembly being connected to the radar receiver and operable to process the portion of the radar signal detected by the radar receiver to determine whether the person is carrying a concealed object on a body of the person by conducting a test in which a first characteristic of a first dielectric constant associated with the person is determined, and a second characteristic of a second dielectric constant associated with the concealed object is determined; and a display coupled to the signal processor assembly that is operable to produce an alert when a concealed object is detected.

2. The system of claim 1 wherein the display is configured to produce a real-time alert when a concealed object is detected.

3. The system of claim 2 wherein the display is configured to produce an audible alert.

4. The system of claim 2 wherein the display is configured to produce a visual alert.

5. The system of claim 2 wherein the display is configured to produce both a visual alert and an audible alert.

6. The system of claim 1 wherein the radar signal comprises a frequency between approximately 1.5 gigahertz and 12 gigahertz.

7. The system of claim 6 wherein the radar signal comprises an output power of less than one milliwatt.

8. The system of claim 6 wherein the radar signal comprises a frequency stepped signal.

9. The system of claim 8 wherein the processor is operable to conduct the test using a frequency-stepped scheme.

10. The system of claim 8 wherein the frequency stepped signal comprises frequencies at defined intervals throughout a defined frequency range.

11. The system of claim 1 wherein the handheld radar frequency scanner system comprises a monostatic radar system.

12. The system of claim 1 wherein the handheld radar frequency scanner system comprises a bistatic radar system.

13. The system of claim 1 wherein the first dielectric constant is determined during the test.

14. The system of claim 13 wherein the first dielectric constant is associated with skin of the person.

15. The system of claim 13 wherein the second dielectric constant is determined during the test.

16. The system of claim 1 wherein the processor is operable to conduct the test based upon a difference between the first dielectric constant and the second dielectric constant, wherein the difference is determined during the test.

17. The system of claim 1 wherein the processor is operable to determine whether the person is carrying a concealed object using a principal component analysis technique.

18. A method for detecting objects concealed on a person using a handheld radar frequency scanner system, the method comprising:

directing a radar signal at a person;

detecting a portion of the radar signal reflected by the person;

processing the portion of the radar signal detected by the radar receiver determine whether the person is carrying a concealed object on a body of the person by conducting a test in which a first characteristic of a first dielectric constant associated with the person is determined, and a second characteristic of a second dielectric constant associated with the concealed object is determined; and producing a visual alert when a concealed object is detected.

19. The method of claim 18 further comprising wherein producing a visual alert comprises producing a real-time alert when a concealed object is detected.

* * * * *